(12) United States Patent
Rothnemer

(10) Patent No.: US 8,830,232 B2
(45) Date of Patent: Sep. 9, 2014

(54) WELL PLACEMENT 3D ADVISOR—METHOD AND SYSTEM TO MONITOR AND ASSIST A WELL PLACEMENT OPERATION

(75) Inventor: Pascal Rothnemer, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 272 days.

(21) Appl. No.: 13/389,626

(22) PCT Filed: Aug. 16, 2010

(86) PCT No.: PCT/EP2010/005020
§ 371 (c)(1),
(2), (4) Date: Feb. 29, 2012

(87) PCT Pub. No.: WO2011/023313
PCT Pub. Date: Mar. 3, 2011

(65) Prior Publication Data
US 2012/0147006 A1  Jun. 14, 2012

(30) Foreign Application Priority Data

Aug. 14, 2009  (EP) .................................... 09167896

(51) Int. Cl.
*G06T 15/00* (2011.01)
*G06T 19/00* (2011.01)
*G06T 17/05* (2011.01)
*E21B 44/00* (2006.01)

(52) U.S. Cl.
CPC ................ *G06T 19/00* (2013.01); *G06T 17/05* (2013.01); *E21B 44/00* (2013.01)
USPC ........................................................ 345/419

(58) Field of Classification Search
CPC ................................. E21B 47/00; E21B 44/00
USPC ............................................................ 345/419
See application file for complete search history.

(56) References Cited

U.S. PATENT DOCUMENTS 4,804,051 A * 2/1989 Ho ................... 175/26
6,885,942 B2 4/2005 Shray et al.
(Continued)

FOREIGN PATENT DOCUMENTS

EP 1455254 9/2004
EP 2065557 6/2009
(Continued)

OTHER PUBLICATIONS

Rommetveit et al. "Real-time, 3D visualization drilling supervision system targets ECD, downhole pressure control", Drilling contracter, vol. Mar./Apr. 2008, pp. 114-118.*

(Continued)

*Primary Examiner* — Kee M Tung
*Assistant Examiner* — Nicholas R Wilson
(74) *Attorney, Agent, or Firm* — Stephanie Chi; Brigitte Jeffery Echols

(57) ABSTRACT

A method of displaying information relating to a well drilling operation, comprising generating a sub-surface model of the underground formation through which the well is being drilled; generating a representation of the well being drilled, of the drilling equipment being used to drill the well, including parameters relating to the use of the drilling equipment; generating a 3D image of the formation, the well and the drilling equipment; and generating an image within the 3D image comprising volumes representing virtual objects, such as a cone of possible well placement if drilling proceeds under the current conditions, or the envelope of investigation of a given sensor.

15 Claims, 5 Drawing Sheets

(56) References Cited

U.S. PATENT DOCUMENTS

| | | |
|---|---|---|
| 6,917,360 B2 | 7/2005 | Terentyev et al. |
| 7,027,925 B2 | 4/2006 | Terentyev et al. |
| 2003/0043170 A1 | 3/2003 | Fleury |
| 2004/0204855 A1 | 10/2004 | Fleury et al. |
| 2005/0139393 A1* | 6/2005 | Maurer et al. .............. 175/57 |
| 2005/0216197 A1 | 9/2005 | Zamora et al. |
| 2006/0074561 A1* | 4/2006 | Xia et al. .................... 702/6 |
| 2006/0293872 A1* | 12/2006 | Zamora et al. ............. 703/10 |
| 2007/0126426 A1 | 6/2007 | Clark et al. |
| 2007/0156340 A1 | 7/2007 | Shray et al. |
| 2009/0152005 A1 | 6/2009 | Chapman et al. |

FOREIGN PATENT DOCUMENTS

| | | |
|---|---|---|
| WO | 02/21158 | 3/2002 |
| WO | 2009/032416 | 3/2009 |

OTHER PUBLICATIONS

Rolv Rommetveit, et la., "Real-time, 3D visualization drilling supervision system targets ECD, downhole pressure control", Drilling contractor, vol. Mar./Apr. 2008, pp. 114-118.

Thin: 'Well Section Placed Precisely' Heavy Oil Reservoir 2008.

Search Report from the equivalent European patent application No. 09167896.1 issued on Apr. 10, 2012.

Extended Search Report from the equivalent European Divisional patent application No. 12075009.6 issued on Apr. 11, 2012.

R. Rommetveit, et al., "eDrilling: A System for Real-Time Drilling Simulation, 3D Visualization, and Control," SPE vol. SPE106903, Apr. 11, 2007.

Rocky Mottahedeh, "Horizontal Well Geo-Navigation: Planning, Monitoring and Geosteering", Internet Citation, URL: http://www.uogc.com/NEWpdf/CIPCPaperU0GCGeonavigation2005.pdf.

* cited by examiner

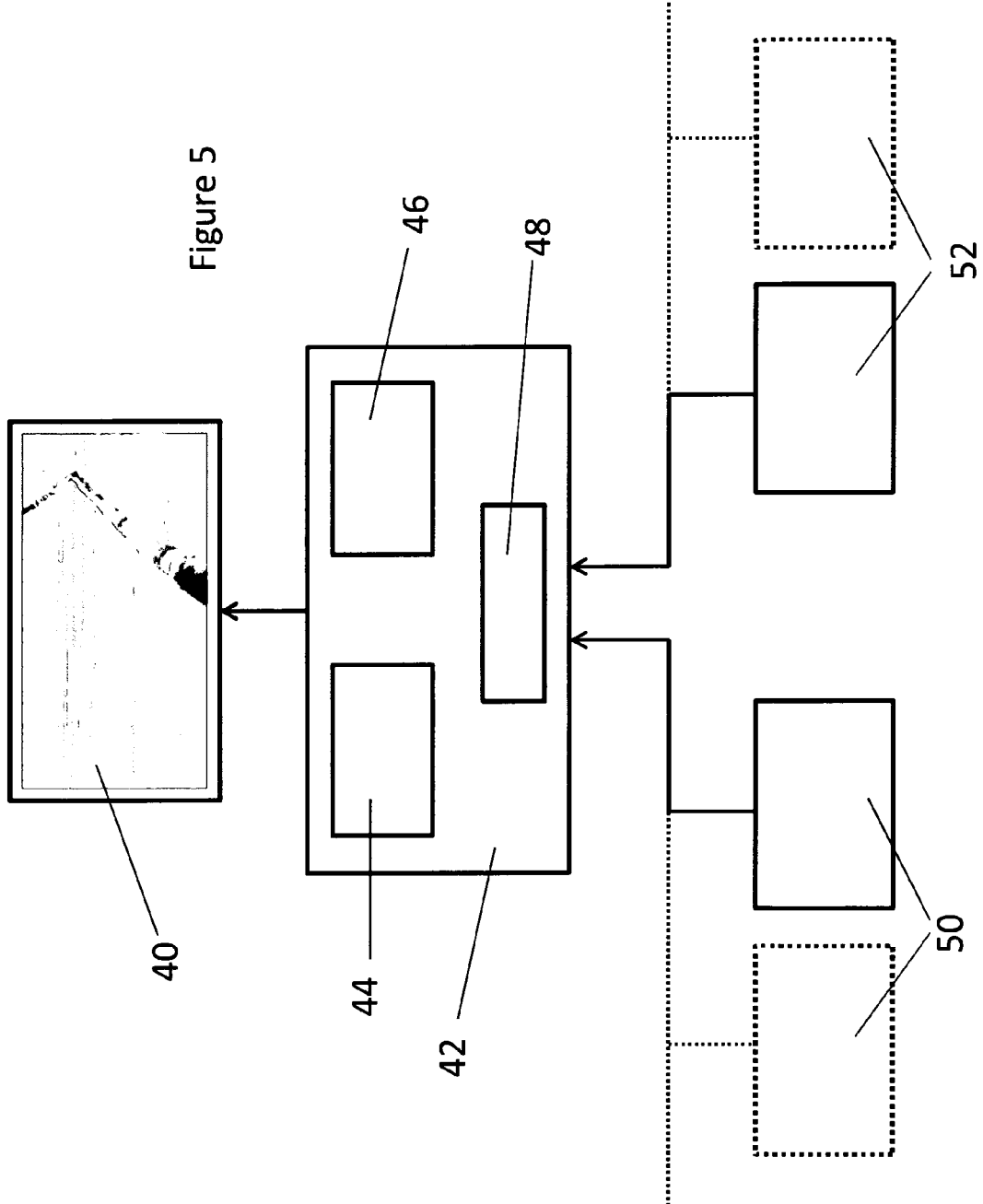

WELL PLACEMENT 3D ADVISOR—METHOD AND SYSTEM TO MONITOR AND ASSIST A WELL PLACEMENT OPERATION

TECHNICAL FIELD

This invention relates to methods for displaying information relating to well drilling operations, of the type typically used in the oil and gas industry. In particular, the method provides images including an indication of possible outcomes ahead of the drill bit.

BACKGROUND ART

Drilling operations used to drill oil and gas wells and the like face a number of challenges. A particular problem arises because the drilling operation take place underground such that it is difficult to obtain an accurate view of what is going on during the drilling process. It can therefore be difficult for the operator to be able to make good decisions to control the drilling process.

Drilling operations typically take place according to a drilling plan that is designed to place the well in the underground formations of interest. This plan will provide an intended well trajectory that the driller tries to follow. The plan will be based on sub-surface information obtained from the surface (such as by seismic surveying) or offset information from adjacent wells.

As the drilling operation proceeds, measurements are taken that can be used to estimate the trajectory of the well, and the position of the drilling equipment. Such measurements can include direction and inclination measurements made by the drilling equipment (surveys or current positions of the well), and formation measurements such as resistivity measurements that provide the information on the formation surrounding the sensor. However, such measurements do not inherently indicate the future trajectory of the well.

A number of existing techniques allow imaging of the well after drilling and association with subsurface formation properties. Schlumberger's WellEye and EcoView products and services allow imaging of such cases. There are a number of existing techniques for visualising sub-surface data associated with drilling operations. Examples can be found in EP07121940.6, U.S. Pat. No. 6,885,942, U.S. Pat. No. 6,917,360, US20030043170, US20040204855, US20050216197 and U.S. Pat. No. 7,027,925. This latter case also discloses animating the images such that dynamic behaviour can be examined. Other examples can be found using combinations of tools and measurements such as bed boundary mappers (e.g. PeriScope from Schlumberger) and real-time data processing, geosteering modelling, and interpretation software (e.g. RTGS Real-Time GeoSteering, and Petrel, both from Schlumberger). One such example is described in the case study: Well Section Placed Precisely in Thin, Heavy Oil Reservoir (2008).

During a well placement operation involving a complex defined trajectory, the drilling equipment including a bottom hole assembly, including a set of logging tools with various sensors, is set up and starts drilling a new well according to a drilling plan. Such operation is today largely conducted in a blind manner with no direct knowledge of the formation ahead of the drill bit. The users, i.e. the driller on the rig, and possibly a well placement engineer and other stakeholders in a remote location, use information from various systems and under different formats: digital data, paper datasheets, 2D drawings of existing wells and surrounding formation, etc. to mentally reconstruct their understanding of what is going on downhole in terms of events and respective positions of the various objects involved (i.e. equipment, well(s), reservoir, formation).

All of the above cases rely on images of a well that has been drilled and so are after the fact. This invention recognises that imaging of the drilling process is most useful where it can be used in the control of the drilling process.

DISCLOSURE OF THE INVENTION

A first aspect of this invention provides a method of displaying information relating to a well drilling operation, comprising:
   generating a sub-surface model of the underground formation through which the well is being drilled;
   generating a 3D image of the formation;
   generating a representation of the well being drilled;
   generating a representation of the drilling equipment being used to drill the well, including parameters relating to the use of the drilling equipment;
   generating a 3D image of the drilling equipment; and
   generating an image within the 3D image comprising volumes representing virtual objects of physical parameters related to the well drilling operation.

The step of generating a representation of the well bring drilled can also account for possible nearby wells in the 3D image of the formation.

The virtual objects of physical parameters related to the well drilling operation can comprise a cone of possible well placement if drilling proceeds under the current conditions, or the envelope of investigation of a given sensor.

The sub surface model can comprise geological structure and man-made structures such as adjacent wells.

In one embodiment, the sub surface model includes a representation of the planned well trajectory and/or a representation of the actual well path, each of which can take into account predetermined position tolerances.

The sub-surface model can also include an image of a drilling target region ahead of the current position of the drilling equipment. The sub-surface model can be generated using data derived from the drilling operation, offset data, and or sub-surface data obtained by other operations.

The representation of the drilling equipment can include both static and dynamic physical properties of the drilling equipment in use. The dynamic properties can include rate of rotation (RPM) and/or rate of penetration (ROP).

The representations and images can be updated based on data obtained from the drilling process so as to provide a real-time display.

The images can be generated relative to a virtual camera position selected by a user.

A second aspect of the invention comprises a method of drilling a well, comprising displaying information according to the first aspect of the invention, and controlling the drilling process depending on the displayed information.

A third aspect of the invention comprises a system for obtaining a display of information relating to a well drilling operation conducted using drilling equipment, the system comprising:
   sensing apparatus for obtaining data for parameters relating to the use of the drilling equipment;
   processing apparatus for processing the data together with further date relating to the drilling equipment, the formation, and the well being drilled to derive a 3D model; and display apparatus for generating a 3D image of the formation, a representation of the well being drilled, a representation of the drilling equipment including the parameters, and a 3D image comprising volumes representing virtual objects of physical parameters relating to the well drilling operation.

The system can display the image generated in accordance with the first aspect of the invention.

Further aspects of the invention will be apparent from the following description.

BRIEF DESCRIPTION OF THE DRAWINGS

FIG. 5 shows a schematic view of a system for implementing a method according to the invention.

MODE(S) FOR CARRYING OUT THE INVENTION

Figure 1:
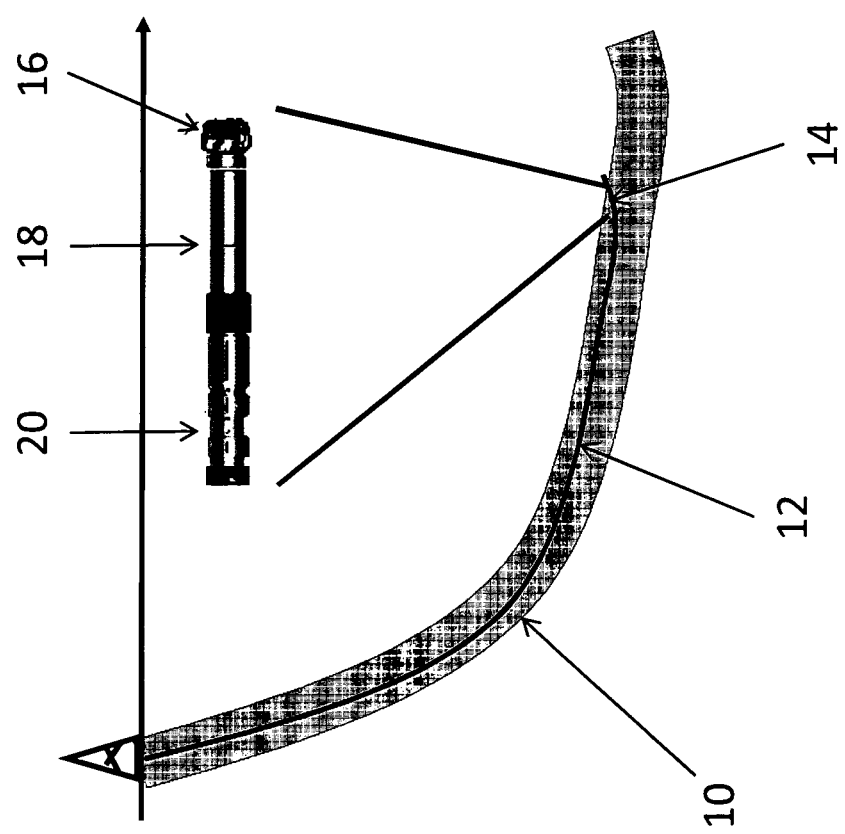
FIG. 1 shows a schematic view of a well plan with the actual well trajectory imposed thereon.

FIG. 1 shows schematically a well plan in two dimensions. The plan provides an intended trajectory 10 for the well to follow. This is typically larger than the well itself to provide a level of tolerance for deviation from the exact projected trajectory while still broadly following the intended path. As drilling progresses, more detailed information allows a more accurate estimate to be made of the well position 12 relative to the planned trajectory.

The drilling equipment (bottom hole assembly: BHA) 14 used to drill the well comprises a drill bit 16, a mud motor 18 and an electronics and logging while drilling (LWD) sub 20.

As can be see from FIG. 1, the BHA 14 is approaching the top of the planned trajectory. The driller now faces the challenge of modifying the drilling operation in order to keep the BHA 14 within the planned trajectory 10.

Figure 2C:
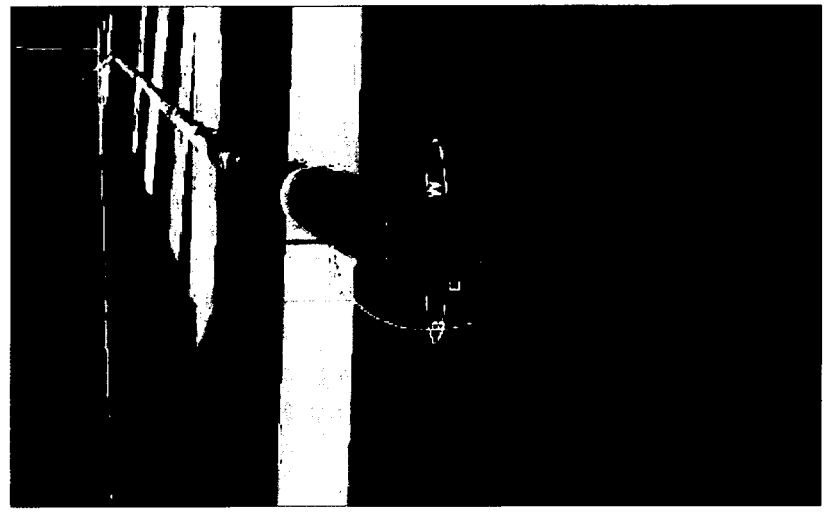
FIGS. 2a-2c shows 2D and 3D well log data images for a borehole.
Figure 2B:
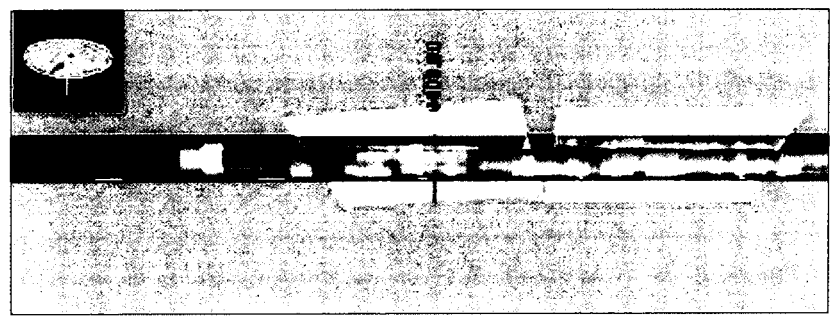
Figure 2A:
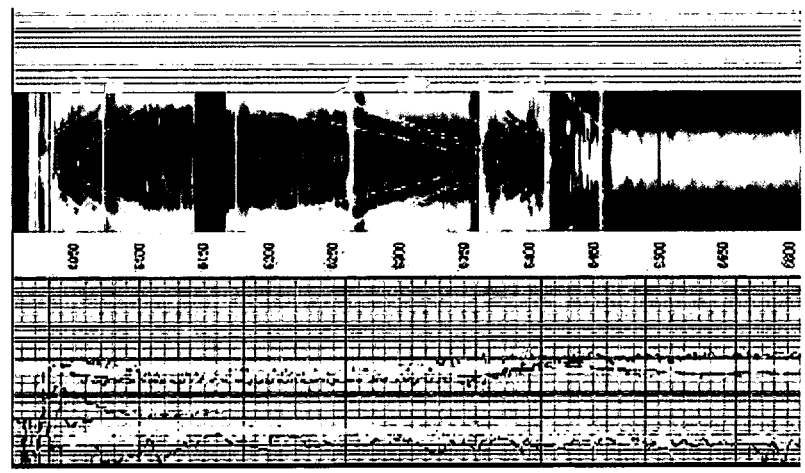

FIGS. 2a-2c show images of the various data available using Schlumberger's geoVISION tools and services and WellEye viewing software. FIG. 2a show the traditional log representation and a corresponding 2D image generates for the well surface. FIG. 2b is a 3D representation of this data, the well being presented as straight. FIG. 2c shows the corresponding view when the actual well trajectory is imposed onto the image. Thus, the well trajectory can be tied to the measured properties of the sub-surface formations.

With the known systems, the past trajectory and possibly the drilling behaviour can be imaged. However, for the drilling operation to proceed, the future possible consequences—in terms of trajectory—of the action taken in terms of directional drilling are not imaged leaving the driller without any visual help. The consequence is that during such risky and difficult operations, a lot of time, energy and concentration is spent in building mental scenes of the subsurface in order that the driller can make appropriate decisions. This may lead to delayed decisions, including stalling the drilling process. In the worst cases it may even lead to a wrong decision, the consequence of which may be catastrophic in terms of operational result, quality and safety.

This invention attempts to address these problems by imaging and animating representations of the sub-surface and drilling process in order to provide a forward looking image that can be used by the driller to make decisions. To generate such images according to the invention, the process considers two main areas: the drilling equipment; and the sub-surface model.

There are two main sources of data for an accurate representation of the drilling equipment:
  the CAD files for the actual equipment (such as the PROEngineer files describing each element of the BHA); and
  dynamic drilling data, such as rotation speed of the bit (RPM), and rate of penetration, both of which can be measured for the BHA at its current position in the drilling process.

Such data can give a model which provides an accurate physical description of the drilling equipment in its current state of use.

The sub-surface model can include existing data such as geophysical or geological data obtained during the drilling process from wireline or LWD measurements, or obtained from offset well data. The physical properties of the underground formation can be derived using a number of well-known models based on this data.

A number of other elements are included in the sub-surface model to provide the required images. These include:
  a. The planned well trajectory, including any azimuthal tolerances.
  b. The actual well trajectory drilled so far. This data can be obtained by measurements such as direction and inclination measurements during drilling, wireline logging data, and the like.
  c. Any nearby wells and associated anti-collision indicators (measurable parameters indicating the proximity of the nearby well).

Three further elements reflect the forward looking aspect of the invention:
  d. A representation of a target for the drilling operation. This can be a contour of the reservoir target for the drilling operation but can also be any other discernible feature of the model.
  e. A cone of possible trajectories to be drilled from the current position of the BHA, direction of drilling and based on the current dynamic drilling data. The angle of the cone represents the degree of uncertainty in the current direction of drilling and the possible deviations that can be envisaged based on the representation of the drilling equipment. The cone is represented by using the known ability of the drilling equipment to modify its drilling direction.
  f. A representation of the envelope of investigation of a given sensor, showing the volume of formation to which the sensor reacts A realistic sub-surface model can be generated from these data and can be continuously updated and refined as new data become available, including the possibility of refining the planned well trajectory if new measurements indicate this is desirable to reach the target formation.

Using these representations and models, it is possible to generate a 3D image that can be manipulated by the user. These images can be animated, allowing a real-time visualisation of the sub-surface activity to be provided. The data from the models of the BHA and sub-surface can be provided to a physics engine and rendering package for the generation of the images. These software products are routinely used in the computer gaming industry to generate complex animations that represent 'realistic' actions that react in real time to input instructions or changes in situation. The 3D engine used in this invention takes into account the sub-surface model and allows images at various scales to be prepared. Also, the 'virtual' camera position of the user can be selected according to user requirements. Features of the image can be provided with labels and/or colour coding to assist in interpretation. Also, visual and audio alarms can be included to indicate the proximity of danger, collisions with other wells or other undesirable outcomes.

Figure 3:
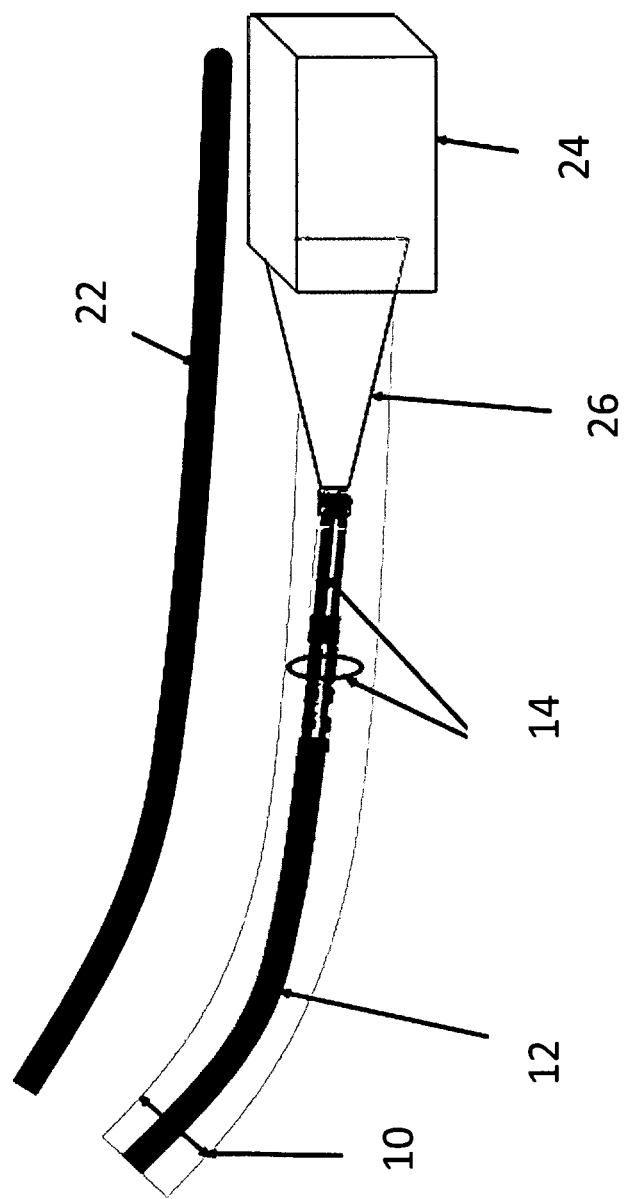
FIG. 3 shows an image generated according to the invention indicating a target and possible future well path.

FIG. 3 shows a partial representation of an image generated in accordance with the invention. As described above in relation to FIG. 1, the image includes the intended trajectory 10 for the well to follow (including azimuthal tolerance), the well position 12 relative to the planned trajectory, and the drilling equipment (bottom hole assembly: BHA) 14 used to drill the well. The image also includes a representation of a nearby well 22, a target formation 24, and a virtual object comprising the cone of possible trajectories 26. While this is essentially shown in 2D in FIG. 3, it can be rendered in 3D and animated to show movement of the system as drilling progresses. Thus the driller is provided with a visual aid that shows how drilling is progressing and allows the consequences of changes to be displayed in the context of the drilling trajectory and the target. While one cone is shown here, multiple cones can be presented, each for a different set of drilling decisions. Thus, selection of the optimum conditions can be aided.

Figure 4:
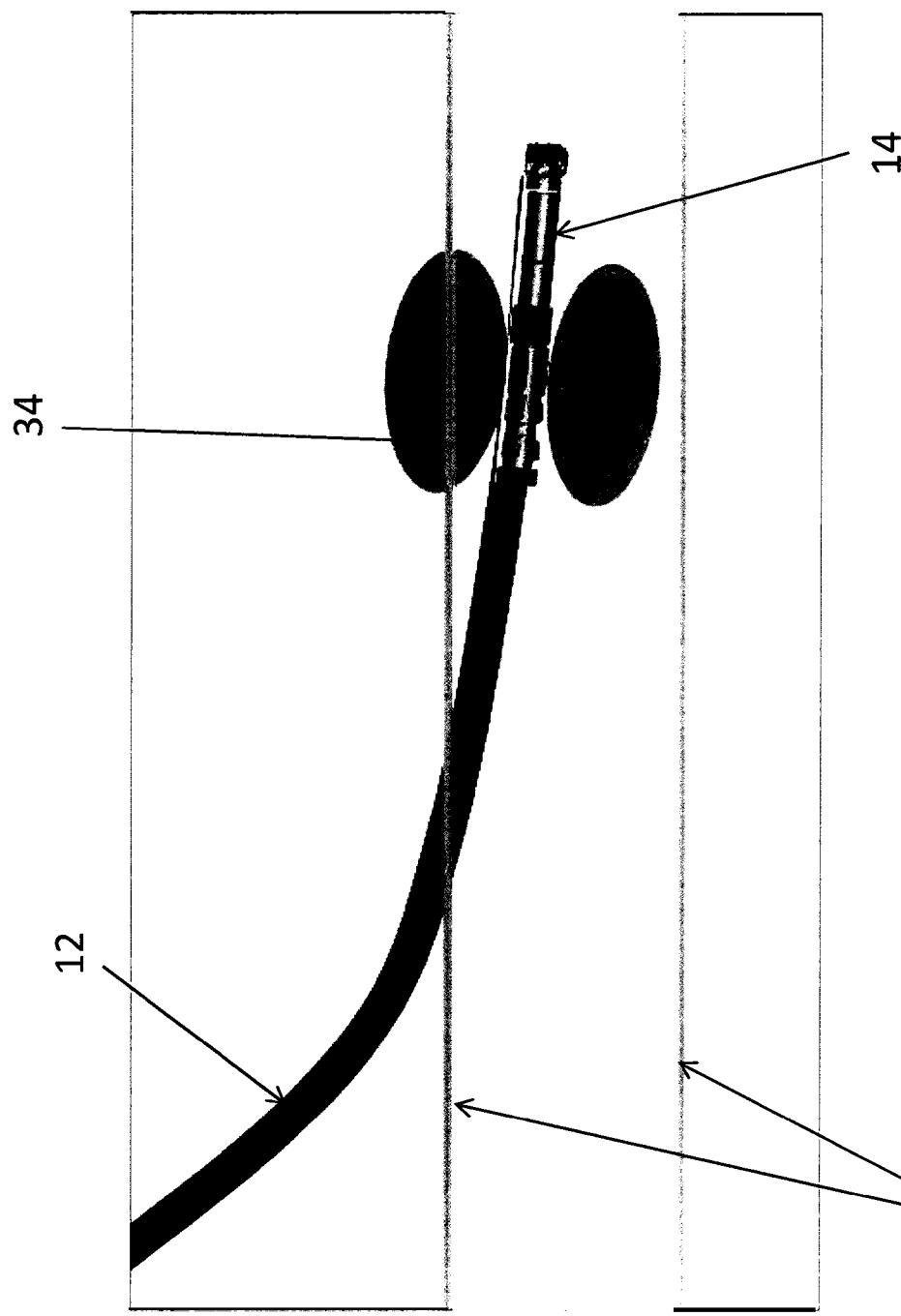
FIG. 4 shows an image generated according to the invention indicating the volume of investigation of a sensor.

FIG. 4 shows a further partial representation of an image generated in accordance with the invention. The image includes the drilling equipment 14 and the well position 12. Formation layers 32 are shown within the image. A virtual object comprising the volume of investigation 34 of a sensor within the drilling equipment (in this case, a deep electromagnetic LWD sensor) is shown as a torus around the drilling equipment 14, and it intersects with the formation layer boundary 32 above the well position 12. Although the volume shown is a torus shape, it should be appreciated that other geometrical shapes are possible and indeed likely. Such volumetric shapes could for example also be a spherical bubble in a perfectly homogenous formation, but other more distorted or asymmetric volumetric shapes could also occur and would depend on the sensor and formation characteristics. By imposing the volume of investigation on the image of the formation, it can be seen that the upper zone 34 reaches into the upper layer whereas the lower zone stays within the target layer. This will aid in interpreting the data from the sensor.

While FIGS. 3 and 4 show the virtual objects separately, they can be presented in the same image.

FIG. 5 shows a simple block diagram to depict the system that can be used to implement the method of invention. A computer 42 acquires data from the downhole equipment which can either be real-time data 50 from one or sources, or recorded data files 52 from the downhole equipment.

The data received in real-time can be de-modulated from mud-pulse or wired drillpipe telemetry data sent up-hole from the BHA. A hardware interface 48 carries out this de-modulation and outputs data into the computer 42. Data can also be acquired in recorded mode, in which the computer loads a dump file extracted from the BHA memory which contains data recorded by the downhole equipment.

A program runs on computer 42 using the data acquired from the downhole equipment and, optionally, a priori knowledge to build a subsurface model.

The computer 42 is equipped with a 3D-enabled graphics board which enables a 3D representation of the subsurface model to be generated.

The 3D representation scenes generated by the computer 42 can then be displayed on a screen or monitor 40 which is preferably a colour display.

The program can be used to generate scenes based on the following information and user inputs:
  Representation of a broad cube of the subsurface encompassing the totality of the objects (wells, layers, equipments, etc) participating to the scene
  Representation within this subsurface of the main objects named above
  Representation of the Bottom Hole Equipment within the main well being drilled
  Representation of additional virtual objects as described (cones of trajectory, sensors' volumes of investigation etc).

The display of such images and scenes can be in an animated sequence, and refreshed every time new data are available, reproducing in real-time or replay mode a realistic view of dynamic events happening during the operation.

The data acquired from the downhole equipment, be it either real-time or recorded data, can be used, processed and displayed in a variety of manners. The computer can also be equipped with a hard drive or similar to save the data and information during an operation for reference after the operation is completed. This would also allow data from both real-time and recorded sources to be viewed together at a later stage. The benefits of the invention can be understood by considering the following examples:

Steam-Assisted Gravity Drainage (SAGD). This is a method for producing heavy oil or bitumen. To achieve production, two wells are drilled, one above the other. The top well serves as the steam injector while the bottom well serves as the producer. As steam is injected into the top well, it rises to the top of the oil producing formation. The high pressure steam decreases the viscosity of the oil in the formation to the point where the oil will flow. This allows the bottom well to produce oil and water that has condensed from the steam.

In order to achieve this, the two wells need to be parallel and follow each other as accurately as possible, so as to optimize the steam injection process. When considering the example shown in FIG. 3, the driller will try to maintain the well trajectory 12 parallel to the existing well 22 while drilling through the target formation.

Deep Resistivity-aided Well Placement. Deep resistivity measurements may be used to estimate whether or not a well being drilled is within the target formation. If the target is, for example, a narrow sand channel and one wants to drill a well that always stays in the middle of the sand channel, resistivity reading changes may help to indicate that the well is heading in the wrong direction so as to leave the channel and a corrective action is required.

In both of these examples, integrated 3D visualization of all elements in place improves the understanding of the situation as well as the quality and rapidity of the decisions to be taken.

Various changes can be made within the scope of the invention. For example, image can be displayed in real time at the surface near the rig to allow real time control. It can also be displayed at a remote office for post-operation analysis and to investigate the possible outcomes of possible future operations.

The invention claimed is:

1. A method of displaying information relating to a drilling operation of a well conducted using a drilling equipment, comprising:
  generating a sub-surface model of an underground formation in which the well is drilled;
  generating a 3D image of the formation;
  generating a representation of the well being drilled;

generating a representation of the drilling equipment being used to drill the well, including parameters relating to the use of the drilling equipment;

generating a 3D image of the drilling equipment; and generating a 3D image comprising volumes representing virtual objects of physical parameters related to the well drilling operation, wherein the volumes representing virtual objects comprises a cone of possible well placement if drilling proceeds under current conditions, with an intersection of the volumes with existing formation layers and nearby wells.

2. A method as claimed in claim 1 whereby the step of generating a representation of the well being drilled also accounts for possible nearby wells in the 3D image of the formation.

3. A method as claimed in claim 1, wherein the volumes representing virtual objects comprises a volume of investigation of a sensor and an intersection of the volumes with existing formation layers.

4. A method as claimed in claim 3, wherein the sub-surface model comprises geological structure.

5. A method as claimed in claim 4, wherein the sub-surface model comprises sub-surface man-made structures.

6. A method as claimed in claim 5, wherein the sub-surface model includes at least one of the following:
   a representation of a planned well trajectory, and
   a representation of an actual well path.

7. A method as claimed in claim 6, wherein each representation takes into account predetermined position tolerances.

8. A method as claimed in claim 7, wherein the sub-surface model includes an image of a drilling target region ahead of a current position of the drilling equipment.

9. A method as claimed in claim 1, wherein the sub-surface model is generated using at least one of the following:
   data derived from the drilling operation,
   offset data, and
   sub-surface data obtained by other operations.

10. A method as claimed in claim 1, wherein the representation of the drilling equipment includes both static and dynamic physical properties of the drilling equipment in use.

11. A method as claimed in claim 10, wherein the dynamic properties include at least one of the following:
   rate of rotation (RPM) and
   rate of penetration (ROP).

12. A method as claimed in claim 1, wherein the representations and images are updated based on data obtained from the drilling operation so as to provide a real-time display.

13. A method as claimed in claim 1, wherein the images are generated relative to a virtual camera position selected by a user.

14. A method of drilling a won as claimed in claim 1, comprising controlling the drilling operation depending on the displayed information.

15. A system for obtaining a display of information relating to a drilling operation of a well conducted using drilling equipment, the system comprising:
   sensing apparatus for obtaining data for parameters relating to the use of the drilling equipment;
   processing apparatus for processing the data obtained by the sensing apparatus together with further data relating to the drilling equipment, a formation surrounding the well, and the well being drilled to derive a 3D model; and
   display apparatus for generating a 3D image of the formation, a representation of the well being drilled, a representation of the drilling equipment including the parameters, and a 3D image comprising volumes representing virtual objects of physical parameters relating to the well drilling operation, wherein the volumes representing virtual objects comprises a cone of possible well placement if drilling proceeds under current conditions, with an intersection of the volumes with existing formation layers and nearby wells.

* * * * *